US012807763B2

(12) United States Patent
Uta et al.

(10) Patent No.: US 12,807,763 B2
(45) Date of Patent: Nov. 24, 2026

(54) TWO-COMPONENT TYPE ROOM TEMPERATURE FAST-CURING ORGANOPOLYSILOXANE COMPOSITION AND ARTICLE

(71) Applicant: SHIN-ETSU CHEMICAL CO., LTD., Tokyo (JP)

(72) Inventors: Akira Uta, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 564 days.

(21) Appl. No.: 18/274,175

(22) PCT Filed: Jan. 18, 2022

(86) PCT No.: PCT/JP2022/001591

§ 371 (c)(1),
(2) Date: Jul. 25, 2023

(87) PCT Pub. No.: WO2022/163436

PCT Pub. Date: Aug. 4, 2022

(65) Prior Publication Data

US 2024/0101762 A1 Mar. 28, 2024

(30) Foreign Application Priority Data

Jan. 27, 2021 (JP) ................................. 2021-010874

(51) Int. Cl.

| | |
|---|---|
| ***C08G 77/16*** | (2006.01) |
| ***C08G 77/08*** | (2006.01) |
| ***C08K 3/013*** | (2018.01) |
| ***C08K 3/04*** | (2006.01) |
| ***C08K 3/22*** | (2006.01) |
| ***C08K 3/26*** | (2006.01) |
| ***C08K 3/36*** | (2006.01) |
| ***C08K 5/17*** | (2006.01) |
| ***C08K 5/5415*** | (2006.01) |
| ***C08K 5/5425*** | (2006.01) |
| ***C08K 5/544*** | (2006.01) |
| ***C08K 9/06*** | (2006.01) |
| ***C08L 83/04*** | (2006.01) |
| ***C09D 7/61*** | (2018.01) |
| ***C09D 7/63*** | (2018.01) |

(Continued)

(52) U.S. Cl.

CPC ............. *C08G 77/16* (2013.01); *C08G 77/08* (2013.01); *C08K 3/013* (2018.01); *C08K 3/04* (2013.01); *C08K 3/22* (2013.01); *C08K 3/26* (2013.01); *C08K 3/36* (2013.01); *C08K 5/17* (2013.01); *C08K 5/5415* (2013.01); *C08K 5/5425* (2013.01); *C08K 5/544* (2013.01); *C08K 9/06* (2013.01); *C08L 83/04* (2013.01); *C09D 7/61* (2018.01); *C09D 7/63* (2018.01); *C09D 183/04* (2013.01); *C09J 183/04* (2013.01); *C09K 3/10* (2013.01); *C08G 2150/00* (2013.01); *C08G 2170/00* (2013.01); *C08G 2190/00* (2013.01); *C08K 2003/2227* (2013.01); *C08K 2003/265* (2013.01); *C08K 2201/006* (2013.01); *C09K 3/1018* (2013.01); *C09K 2103/00* (2013.01)

(58) Field of Classification Search

CPC ........... C08L 83/04; C08L 83/00; C08K 3/36; C08K 5/5425; C08K 5/544; C08K 5/5465; C08K 9/06; C09J 183/04; C09D 183/04

See application file for complete search history.

(56) References Cited

U.S. PATENT DOCUMENTS

2008/0251200 A1* 10/2008 Kimura .................. C08L 83/04 524/588
2011/0034613 A1 2/2011 Araki et al.

(Continued)

FOREIGN PATENT DOCUMENTS

JP 3916403 B2 5/2007
JP 2011-37968 A 2/2011

(Continued)

OTHER PUBLICATIONS

International Search Report for PCT/JP2022/001591 (PCT/ISA/210) mailed on Apr. 12, 2022.

(Continued)

*Primary Examiner* — Eli D. Strah
(74) *Attorney, Agent, or Firm* — Birch, Stewart, Kolasch & Birch, LLP

(57) ABSTRACT

This two-component type room temperature fast-curing organopolysiloxane composition: includes a first agent containing, at a specific ratio, (A) a specific structure organopolysiloxane having a silanol group or a hydrolyzable silyl group at molecular chain ends thereof, (B) a hydrolyzable organosilane compound and/or a partially hydrolyzed condensate thereof that releases a cyclic ketone compound as a leaving group (leaving substance) by hydrolysis, and (C) a curing catalyst; and a second agent containing, in a specific amount, (A') a specific structure organopolysiloxane having a silanol group at molecular chain ends thereof; and has more excellent hardenability than one-component type room temperature-curing organopolysiloxane compositions. This composition leaves or releases a cyclic ketone compound such as cyclobutanone or cyclopentanone as a leaving group (leaving compound) at the time of curing, and thus solves hazard or safety problems with respect to human bodies or environments.

18 Claims, No Drawings

(51) Int. Cl.

| | |
|---|---|
| ***C09D 183/04*** | (2006.01) |
| ***C09J 183/04*** | (2006.01) |
| ***C09K 3/10*** | (2006.01) |
| *C09K 103/00* | (2006.01) |

(56) References Cited

U.S. PATENT DOCUMENTS

| | | | |
|---|---|---|---|
| 2020/0115503 | A1 | 4/2020 | Langerbeins et al. |
| 2020/0392339 | A1 | 12/2020 | Uta et al. |

FOREIGN PATENT DOCUMENTS

| | | | | |
|---|---|---|---|---|
| JP | 2015113377 | A | * | 6/2015 |
| JP | 2019-73670 | A | | 5/2019 |
| JP | 2020-517771 | A | | 6/2020 |
| JP | 2020-147750 | A | | 9/2020 |
| KR | 10-2020-0123462 | A | | 10/2020 |

OTHER PUBLICATIONS

Registry [online], Jan. 21, 1985, [retrieved on Mar. 30, 2022], Retrieved from: STN, CAS Registry No. 94358-77-7, total of 1 page (silane, tris(1-cyclopenten-1-yloxy)methyl-(9Cl)).

* cited by examiner

TWO-COMPONENT TYPE ROOM TEMPERATURE FAST-CURING ORGANOPOLYSILOXANE COMPOSITION AND ARTICLE

TECHNICAL FIELD

The present invention relates to a condensation-curable two-pack type room temperature fast-curable organopolysiloxane composition that is crosslinked (cured) through a hydrolysis/condensation reaction by humidity (moisture) in the air at room temperature (23° C.±15° C.), particularly a two-pack type room temperature fast-curable organopolysiloxane composition containing a crosslinking agent in which a leaving compound desorbed/generated from the crosslinking agent (curing agent) through a hydrolysis reaction during curing is a cyclic ketone compound such as cyclobutanone or cyclopentanone, various articles including the composition or a cured product thereof (silicone rubber), and the like.

BACKGROUND ART

Room temperature curable organopolysiloxane compositions that are cured at room temperature to form silicone rubber have been heretofore known and widely used in industry. As mechanisms of being cured at room temperature, a mechanism of being cured through a hydrosilylation addition reaction, a mechanism of being radically cured by ultraviolet rays, a mechanism of being cured through a condensation reaction between a hydrolyzable group bonded to a silicon atom and a hydroxyl group, and the like are known. In particular, a room temperature curable organopolysiloxane composition which is cured through a condensation reaction has an advantage that it can be easily cured at room temperature, and is unlikely to undergo inhibition of curing by impurities which occurs in a hydrosilylation addition reaction or the like. Therefore, it is widely used in the fields of in-vehicle gaskets and sealing materials, building sealants, electrical or electronic parts, and the like.

A room temperature curable organopolysiloxane composition that is cured through a condensation reaction contains a hydrolyzable organosilane compound having a hydrolyzable group in the molecule as a curing agent (crosslinking agent) in the composition, and as curing agents that have widely used, a deoximation-type hydrolyzable organosilane compound that releases an oxime compound such as 2-butanone oxime during curing, a dealcoholization-type hydrolyzable organosilane compound that releases an alcohol compound such as methanol, and the like are known. A rubbery cured product obtained by curing such a composition containing a curing agent has high heat resistance, chemical resistance and weather resistance originating from silicone (siloxane structure).

On the other hand, the deoximation-type curing agent is not preferable because an oxime compound such as 2-butanone oxime which is generated by the curing agent during curing may be carcinogenic, and the dealcoholization-type curing agent is not preferable from the viewpoint of the health of the human body because methanol generated by the curing agent during curing is toxic to the human body and is designated as a deleterious substance. Furthermore, in these compositions, there are cases where a tin catalyst whose regulation is strengthened as an environmentally hazardous substance is used as a curing catalyst, which is not preferable from the viewpoint of environmental protection.

In addition, in a conventional one-pack type room temperature curable organopolysiloxane composition cured by a condensation reaction, curing proceeds from its surface in contact with moisture in the air, but it has a disadvantage that it takes time to complete curing in a deep portion in which moisture is difficult to contact. Therefore, there is known a technique for greatly improving curability by forming a room temperature curable organopolysiloxane composition of two-pack type in which a base polymer and a crosslinking agent, a catalyst, and the like are appropriately divided.

JP-B 3916403 (Patent Document 1) proposes a composition containing an organic compound having at least one carbonyl group (C=O group) in one molecule and an organic compound having at least one primary amino group ($NH_2$ group) in one molecule with respect to a diorganopolysiloxane blocked with a hydrolyzable silyl group, which has an oxime structure as a leaving group at both molecular chain terminals. This is obtained by improving deep curability and fast curability using water produced as a by-product from a ketimine production reaction by a carbonyl group and a primary amino group, but there is a disadvantage that it is necessary to intentionally add a large amount of carbonyl compound to either of the two packs, and component separation is likely to occur in a composition containing the carbonyl compound. In addition, since a dealcoholization-type organopolysiloxane composition is inferior in curability to a deoximation-type organopolysiloxane composition, a sufficient curing rate cannot be obtained even when the method of Patent Document 1 is used. Therefore, as in JP-A 2011-37968 (Patent Document 2), it has been reported that the curability is dramatically improved by mixing an organopolysiloxane having a silanol group and a ketene silyl acetal type compound in the presence of an organic compound having a nitrogen atom, and then mixing them with a composition in which a silanol group is present, but this technique is not as good as the technique of Patent Document 1 in which water is generated from inside the composition in terms of deep curability. In addition, these techniques cannot reduce toxicity and environmental load of the leaving group (methanol, 2-butanone oxime) released during curing of the room temperature curable organopolysiloxane compositions of deoximation type and dealcoholization type as described above.

PRIOR ART DOCUMENTS

Patent Documents

Patent Document 1: JP-B 3916403
Patent Document 2: JP-A 2011-37968

SUMMARY OF INVENTION

Technical Problem

The present invention has been made in view of the above-described circumstances, and an object of the present invention is to provide a room temperature curable organopolysiloxane composition, specifically a room temperature fast-curable organopolysiloxane composition of two pack type which is excellent in fast curability and deep curability, and in which a hydrolyzable organosilane compound that desorbs and releases a cyclic ketone compound such as cyclobutanone or cyclopentanone, which has not been reported to have health harmfulness to the human body such as carcinogenicity and reproduction toxicity and environmental harmfulness such as toxicity to aquatic organisms during curing and which has a relatively high burning point, as a leaving group (leaving compound), is used as a crosslinking agent (curing agent), and various articles including the composition, various articles having a molded product of an elastomer (silicone rubber cured product) obtained by curing the two-pack type room temperature fast-curable organopolysiloxane composition, and the like.

Solution to Problem

The present inventors have intensively conducted studies for achieving the above described object, and resultantly found that a two-pack type room temperature fast-curable organopolysiloxane composition including a first pack containing (A) an organopolysiloxane having a specific structure having a silanol group or a hydrolyzable silyl group at a molecular chain terminal, (B) a hydrolyzable organosilane compound having the following general formula (4) and/or a partial hydrolytic condensate thereof, and (C) a curing catalyst at a specific ratio, and a second pack containing a specific amount of (A') an organopolysiloxane having a specific structure having a silanol group at a molecular chain terminal is more excellent in curability than a room temperature fast curable organopolysiloxane composition of a one-pack type, and desorbs and releases a cyclic ketone compound such as cyclobutanone or cyclopentanone as a leaving group (leaving compound) during curing, and therefore solves problems of harmfulness to human body and environment and safety.

[Chem. 1]

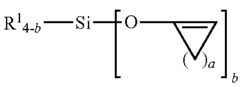

(4)

wherein $R^1$ is a monovalent hydrocarbon group having 1 to 10 carbon atoms, a is an integer of 1 to 8, and b is 3 or 4.

In the two-pack type room temperature fast-curable organopolysiloxane composition, by mixing a first pack containing as a base polymer an organopolysiloxane having a specific structure in which a molecular chain terminal is blocked with a hydrolyzable silyl group or an organopolysiloxane in which a molecular chain terminal is blocked with a hydrolyzable silyl group which is produced by allowing an organopolysiloxane in which a molecular chain terminal is blocked with a silanol group and a specific hydrolyzable silane compound to coexist with a curing catalyst, and a second pack containing an organopolysiloxane in which a molecular chain terminal is blocked with a silanol group as a base polymer, it is presumed that the terminal hydrolyzable silyl group of the base polymer in the first pack and the terminal silanol group of the base polymer in the second pack are directly crosslinked to improve curability as compared with the one-pack room temperature curable organopolysiloxane composition.

In addition, with respect to the above-described problem of curability, it has been found that in the present invention, a hydrolyzable organosilane compound (crosslinking agent) whose leaving group (leaving compound) is a cyclic ketone compound such as cyclobutanone or cyclopentanone, which has not been reported to have health harmfulness to the human body such as carcinogenicity and reproduction toxicity and environmental harmfulness such as toxicity to aquatic organisms and which has a relatively high burning point as the component (B) and an organic compound having at least one primary amino group ($NH_2$ group) in one molecule as the component (D) are used in combination, whereby a composition having excellent fast curability is obtained by generating moisture from the inside due to a ketimine reaction while separation of the organopolysiloxane composition is suppressed even without requiring addition of a ketone compound as in Patent Document 1, leading to attainment of the present invention.

That is, the present invention provides the following two-pack type room temperature fast-curable organopolysiloxane composition, various articles (e.g. automobile parts, automobile oil seals, electric and electronic parts, building structures, civil engineering structures, adhesive agents, sealing agents, potting agents and coating agents) including the composition or a cured product thereof, and the like.

[1]

A two-pack type room temperature fast-curable organopolysiloxane composition consisting of:

a first pack comprising (A) 10 to 90 parts by weight of an organopolysiloxane having the following general formula (1), (2), or (3):

[Chem. 2]

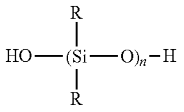

(1)

wherein R is the same or different and is an unsubstituted or halogen atom-substituted monovalent hydrocarbon group having 1 to 10 carbon atoms, and n is an integer of 5 or more,

[Chem. 3]

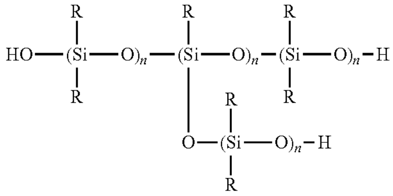

(2)

wherein R and n are as described above, n may be the same or different, and m is an integer of 1 to 10,

[Chem. 4]

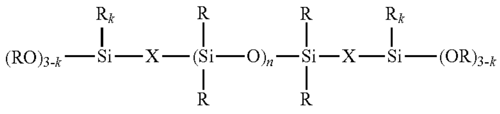

(3)

wherein R and n are as described above, X is an oxygen atom or an alkylene group having 2 to 5 carbon atoms, and k is 0 or 1 independently for each silicon atom to be bonded, with the proviso that the total amount of the components (A) and (A') is 100 parts by weight, (B) a hydrolyzable organosilane compound having the following general formula (4) and/or a partial hydrolytic condensate thereof, in an amount of 0.1 to 30 parts by weight per 100 parts by weight of the total of the components (A) and (A'),

[Chem. 5]

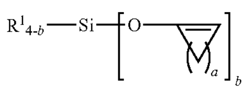

(4)

wherein $R^1$ is a monovalent hydrocarbon group having 1 to 10 carbon atoms, a is an integer of 1 to 8, and b is 3 or 4, and (C) a curing catalyst in an amount of 0.001 to 10 parts by weight per 100 parts by weight of the total of the components (A) and (A'), and a second pack comprising (A') 10 to 90 parts by weight of an organopolysiloxane having the following general formula (1) or (2):

[Chem. 6]

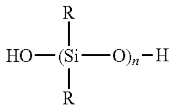

(1)

wherein R is the same or different and is an unsubstituted or halogen atom-substituted monovalent hydrocarbon group having 1 to 10 carbon atoms, and n is an integer of 10 or more,

[Chem. 7]

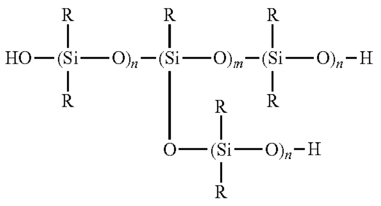

(2)

wherein R and n are as described above, n may be the same or different, and m is an integer of 1 to 10, with the proviso that the total amount of the components (A) and (A') is 100 parts by weight.

[2]

The two-pack type room temperature fast-curable organopolysiloxane composition according to [1], further comprising (D) an amine compound having a primary amino group as a curing accelerator in an amount of 0 to 20 parts by weight per 100 parts by weight of the total of the components (A) and (A') in each of the first and second packs, with the proviso that at least either one of the first and second packs contains 0.1 parts by weight or more of the amine compound.

[3]

The two-pack type room temperature fast-curable organopolysiloxane composition according to [1] or [2], wherein the hydrolyzable organosilane compound and/or a partial hydrolytic condensate thereof as the component (B) desorbs a cyclic ketone compound by hydrolysis.

[4]

The two-pack type room temperature fast-curable organopolysiloxane composition according to [3], wherein the cyclic ketone compound desorbed is cyclobutanone or cyclopentanone.

[5]

The two-pack type room temperature fast-curable organopolysiloxane composition according to any one of [1] to [4], further comprising (E) an inorganic filling agent in an amount of 0 to 1,000 parts by weight per 100 parts by weight of the total of the components (A) and (A') in each of the first and second packs, with the proviso that at least either one of the first and second packs contains 0.1 parts by weight or more of the inorganic filling agent.

[6]

The two-pack type room temperature fast-curable organopolysiloxane composition according to [5], wherein the component (E) is one or more inorganic filling agents selected from calcium carbonate, fumed silica, precipitated silica, carbon black, and aluminum oxide.

[7]

The two-pack type room temperature fast-curable organopolysiloxane composition according to any one of [1] to [6], further comprising (F) an adhesion promoter in an amount of 0 to 10 parts by weight per 100 parts by weight of the total of the components (A) and (A') in each of the first and second packs, with the proviso that at least either one of the first and second packs contains 0.001 parts by weight or more of the adhesion promoter.

[8]

The two-pack type room temperature fast-curable organopolysiloxane composition according to any one of [1] to [7], wherein a blending ratio of the first and second packs is 1:1 to 10:1 by weight ratio.

[9]

An automobile part including a cured product of the two-pack type room temperature fast-curable organopolysiloxane composition according to any one of [1] to [8].

[10]

An automobile oil seal including a cured product of the two-pack type room temperature fast-curable organopolysiloxane composition according to any one of [1] to [8].

[11]

An electrical or electronic part including a cured product of the two-pack type room temperature fast-curable organopolysiloxane composition according to any one of [1] to [8].

[12]

A building structure including a cured product of the two-pack type room temperature fast-curable organopolysiloxane composition according to any one of [1] to [8].

[13]

A civil engineering structure including a cured product of the two-pack type room temperature fast-curable organopolysiloxane composition according to any one of [1] to [8].

[14]

An adhesive agent including the two-pack type room temperature fast-curable organopolysiloxane composition according to any one of [1] to [8].

[15]

A sealing agent including the two-pack type room temperature fast-curable organopolysiloxane composition according to any one of [1] to [8].

[16]

A potting agent including the two-pack type room temperature fast-curable organopolysiloxane composition according to any one of [1] to [8].

[17]

A coating agent including the two-pack type room temperature fast-curable organopolysiloxane composition according to any one of [1] to [8].

Advantageous Effects of Invention

The two-pack type room temperature fast-curable organopolysiloxane composition of the present invention is of a two-pack type consisting of a first pack and a second pack. Thus, when the first and second packs are mixed, fast curability and deep curability are excellent.

The two-pack type room temperature fast-curable organopolysiloxane composition of the present invention is particularly excellent in rapid curability in air at room temperature, and has good workability. Further, it has storage stability. Therefore, even after storage for a long period of time, for example, 6 months, when the first pack and the second pack are mixed and exposed to air, the two-pack type room temperature fast-curable organopolysiloxane composition of the present invention quickly cures and exhibits excellent physical properties. Furthermore, the crosslinking agent used in the present invention releases a cyclic ketone compound such as cyclobutanone or cyclopentanone, which has not been reported to have health harmfulness to the human body such as carcinogenicity and reproduction toxicity and environmental harmfulness such as toxicity to aquatic organisms and which has a relatively high burning point, as a leaving group (leaving substance), and thus can be suitably used as various adhesive agents, sealing agents, potting agents, coating agents, and the like in consideration of the health and safety of the human body and environmental protection (load reduction).

DESCRIPTION OF EMBODIMENTS

Hereinafter, the present invention is described in more detail.

<Two-Pack Type Room Temperature Fast-Curable Organopolysiloxane Composition>

The two-pack type room temperature fast-curable organopolysiloxane composition of the present invention consist of a first pack containing specific amounts of components (A), (B) and (C) described later, and a second pack containing component (A'). It is noted that the second pack does not contain the components (B) and (C).

Hereinafter, each component is described in detail. In the present invention, the viscosity is a value measured with a rotational viscometer at 23° C. in accordance with the method specified in JIS Z-8803. Unless otherwise specified, the term "room temperature" refers to a state of in which the temperature is 23° C.±15° C. and the humidity is 50% RH±5% RH.

[Component (A), Component (A'): Organopolysiloxane]

The component (A) is an organopolysiloxane having the general formula (1), (2), or (3) described later, which is blended into the first pack. The component (A') is an organopolysiloxane having the general formula (1) or (2) described later, which is blended into the second pack. The component (A) and the component (A') act as main components (base polymers) in the two-pack type room temperature fast-curable organopolysiloxane composition of the present invention.

The component (A) used in the two-pack type room temperature fast-curable organopolysiloxane composition of the present invention is an organopolysiloxane having the following general formula (1), (2) or (3), preferably having a viscosity of 20 to 1,000,000 mPa·s at 23° C., and the component (A') is an organopolysiloxane having the following general formula (1) or (2), preferably having a viscosity of 20 to 1,000,000 mPa·s at 23° C.

[Chem. 8]

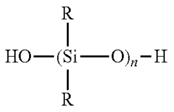
(1)

wherein R is the same or different and is an unsubstituted or halogen atom-substituted monovalent hydrocarbon group having 1 to 10 carbon atoms, and n is an integer of 5 or more.

[Chem. 9]

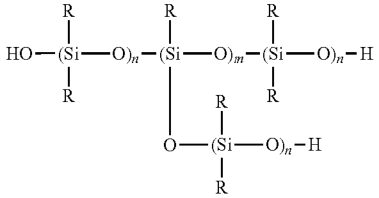
(2)

wherein R and n are as described above, and n may be the same or different, and m is an integer of 1 to 10.

[Chem. 10]

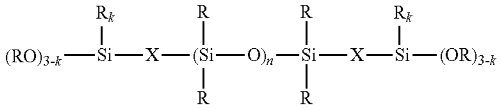
(3)

wherein R and n are as described above, X is an oxygen atom or an alkylene group having 2 to 5 carbon atoms, and k is 0 or 1 independently for each silicon atom to be bonded.

In the general formulae (1), (2), and (3), R is an unsubstituted or halogen atom-substituted monovalent hydrocarbon group having 1 to 10 carbon atoms, and is, for example, alkyl groups such as a methyl group, an ethyl group, and a propyl group; cycloalkyl groups such as a cyclohexyl group; alkenyl groups such as a vinyl group and an allyl group; aryl groups such as a phenyl group and a tolyl group; and groups in which some of the hydrogen atoms bonded to carbon atoms of these groups are partially substituted by a halogen atom, for example, a 3,3,3-trifluoropropyl group, or the like. Among them, a methyl group, a vinyl group, a phenyl group, and a 3,3,3-trifluoropropyl group are preferable, and a methyl group is particularly preferable. A plurality of R in the general formulae (1), (2), and (3) may be the same group or different groups.

In addition, n is an integer of 5 or more, particularly an integer such that the viscosity of the diorganopolysiloxane at 23° C. is in the range of 20 to 1,000,000 mPa·s, preferably in the range of 100 to 300,000 mPa·s. Specifically, the value of n that gives such a viscosity may be an integer of usually 5 to 2,000, preferably 20 to 1,500, more preferably about 50 to 1,000. In the present invention, the degree of polymerization (or molecular weight) can be typically determined as a number average degree of polymerization (or numerical average molecular weight) or the like in terms of polystyrene in gel permeation chromatography (GPC) analysis using toluene or the like as a developing solvent.

Further, in the general formula (2), m represents the number of branched chains, and is an integer of 1 to 10, preferably an integer of 1 to 5, more preferably an integer of 1 to 3. In the formula (2), the repeating units may be randomly arranged.

Furthermore, in the general formula (3), X represents an oxygen atom or an alkylene group having 2 to 5 carbon atoms, and examples of the alkylene group having 2 to 5 carbon atoms include an ethylene group, a propylene group, and a butylene group. Among them, an oxygen atom and an ethylene group are preferable as X.

k is 0 or 1 independently for each silicon atom to be bonded.

The viscosity of the organopolysiloxane as the component (A) and the component (A') at 23° C. is preferably 20 to 1,000,000 mPa·s, more preferably 100 to 300,000 mPa·s, still more preferably 1,000 to 200,000 mPa·s, particularly preferably 10,000 to 100,000 mPa·s. If the viscosity of the organopolysiloxane is less than the lower limit value (20 mPa·s), an economic disadvantage arises because a large amount of a component (B) described later is required. It is not preferable that the viscosity of the organopolysiloxane is more than the upper limit value (1,000,000 mPa·s) because workability is deteriorated.

The organopolysiloxanes as the component (A) and the component (A') may be each used alone or in combination of two or more thereof. Also, the organopolysiloxanes as the component (A) and the component (A') may be the same as or different from each other.

[Component (B): Hydrolyzable Organosilane Compound and/or Partial Hydrolytic Condensate Thereof]

The component (B) used for the two-pack type room temperature fast-curable organopolysiloxane composition of the present invention is a hydrolyzable organosilane compound of the following general formula (4) and/or a partial hydrolytic condensate thereof, is used as a crosslinking agent (curing agent), and releases a cyclic ketone compound such as cyclobutanone or cyclopentanone as a leaving group (leaving substance) by hydrolysis. The cyclic ketone compound which is the leaving group (leaving substance) reacts with the curing accelerator (D) described later to generate water, thereby imparting fast curability and deep curability to the two-pack type room temperature fast-curable organopolysiloxane composition.

In the present invention, the term "partial hydrolytic condensate" means an organosiloxane oligomer which is generated by partially hydrolyzing and condensing the hydrolyzable organosilane compound and has three or more, preferably four or more remaining hydrolyzable groups in the molecule.

[Chem. 11]

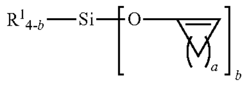

(4)

wherein $R^1$ is a monovalent hydrocarbon group having 1 to 10 carbon atoms, a is an integer of 1 to 8, and b is 3 or 4.

In the general formula (4), $R^1$ is a monovalent hydrocarbon group having 1 to 10 carbon atoms, preferably 1 to 6 carbon atoms, more preferably an alkyl group having 1 to 6 carbon atoms, an alkenyl group having 2 to 6 carbon atoms, an aryl group having 6 to 10 carbon atoms, or an aralkyl group having 7 to 10 carbon atoms, and examples of $R^1$ include alkyl groups such as a methyl group, an ethyl group, a propyl group, an isopropyl group, a butyl group, an isobutyl group, a sec-butyl group, a tert-butyl group, a pentyl group, a hexyl group, an octyl group, a 2-ethylhexyl group, a nonyl group and a decyl group; alkenyl groups such as a vinyl group, an allyl group, a propenyl group, an isopropenyl group, a butenyl group and a hexenyl group; aryl groups such as a phenyl group and a tolyl group; and aralkyl groups such as a benzyl group and a phenylethyl group. Among them, a methyl group, an ethyl group, a vinyl group, and a phenyl group are preferable, and a methyl group, a vinyl group and a phenyl group are particularly preferable.

In the above general formula (4), a is an integer of 1 to 8, preferably an integer of 2 to 6, more preferably an integer of 2 to 4, still more preferably 2 or 3. If a is 0, a cyclic structure is not formed. If a is an integer of 9 or more, the molecular weight of the hydrolyzable organosilane compound increases, so that purification by distillation becomes difficult, or a disadvantage in terms of cost arises because the addition amount necessary for securing storage-ability increases.

As described above, b is 3 or 4. If this number is less than 3, rubber curing through a crosslinking reaction does not occur, and the component is not suitable as a crosslinking agent for a two-pack type room temperature fast-curable organopolysiloxane composition.

The leaving group (leaving compound) generated by hydrolysis of the hydrolyzable organosilane compound represented of the general formula (4) is a cyclic ketone compound such as cyclopropanone, cyclobutanone, cyclopentanone, cyclohexanone, cycloheptanone, cyclooctanone, cyclononanone or cyclodecanone, preferably cyclobutanone or cyclopentanone, more preferably cyclopentanone. Cyclobutanone and cyclopentanone have not been reported to have health harmfulness to the human body such as carcinogenicity and reproduction toxicity, or environmental harmfulness such as toxicity to aquatic organisms. Since cyclopentanone is industrially mass-produced, and easily obtained, and has high cost competitiveness, cyclopentanone is advantageous for production of a hydrolyzable organosilane compound as the component (B) as described later.

The hydrolyzable organosilane compound as the component (B) can be produced by, for example, reaction (e.g. dehydrochlorination reaction) of a chlorosilane compound corresponding to the hydrolyzable organosilane compound of the general formula (4) as a product and a cyclic ketone compound in the presence of a catalyst and a basic substance. This reaction formula is represented by, for example, the following formula [1].

[Chem. 12]

[1]

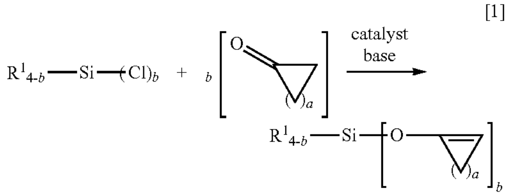

wherein $R^1$, a and b are as described above.

Here, examples of the chlorosilane compound include those shown below.

[Chem. 13]

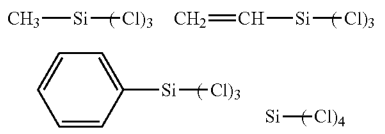

Here, examples of the cyclic ketone compound include those shown below.

[Chem. 14]

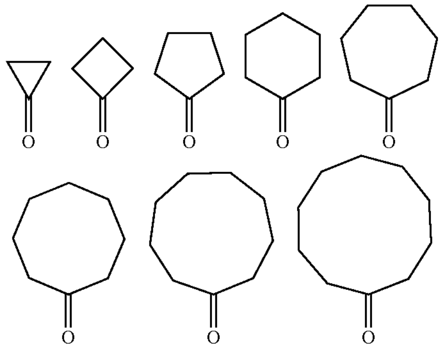

The addition amount of the cyclic ketone compound reacted with the chlorosilane compound is preferably 0.95 to 3.0 mol, more preferably 0.99 to 2.5 mol, still more preferably 1.0 to 2.0 mol per 1 mol of chlorine atoms in the chlorosilane compound. If the addition amount of the cyclic ketone compound is small, there is a possibility that the reaction is not completed, and if the addition amount of the cyclic ketone compound is excessively large, much time may be required for purification, leading to an increase in production time.

Examples of the catalyst used in the reaction include, but are not limited to, monovalent or divalent metal copper compounds, for example, copper chloride, copper bromide, copper iodide, copper sulfate, copper nitrate, copper carbonate, basic copper carbonate, copper formate, copper acetate, and copper butyrate.

The addition amount of the catalyst (metal copper compound) is preferably 0.001 to 0.5 mol, more preferably 0.002 to 0.2 mol, still more preferably 0.003 to 0.1 mol per 1 mol of the chlorosilane. If the addition amount of the catalyst is small, there is a possibility that the reaction is not completed, and if the addition amount of the catalyst is excessively large, a disadvantage in terms of cost arises.

As the basic substance used in the reaction, basic substances having low nucleophilicity, such as trimethylamine, triethylamine, tripropylamine, tributylamine, urea, diazabicycloundecene and diazabicyclononene, can be used. Among them, trimethylamine, triethylamine and tributylamine are preferable, and triethylamine is particularly preferable.

The addition amount of the basic substance is preferably 0.95 to 2.5 mol, more preferably 0.99 to 2.0 mol, still more preferably 1.0 to 1.5 mol per 1 mol of chlorine atoms in the chlorosilane. If the addition amount of the basic substance is small, there is a possibility that the reaction is not completed, and if the addition amount of the basic substance is excessively large, an economic disadvantage arises.

For production of the hydrolyzable organosilane compound as the component (B), a commonly used solvent may be used, and examples of the solvent include organic solvents, for example, aromatic hydrocarbons such as toluene, xylene and benzene; aliphatic hydrocarbons such as pentane, hexane, heptane, nonane, octane and decane; ethers such as dimethyl ether, methyl ethyl ether, tetrahydrofuran and dioxane; halogenated hydrocarbons such as perchloroethane, perchloroethylene, trichloroethane, chloroform and carbon tetrachloride; amides such as dimethylformamide; and esters such as ethyl acetate, methyl acetate and butyl acetate.

The amount of the solvent used is not particularly limited, and is, typically, in the range of 10 to 500 parts by weight, preferably 30 to 400 parts by weight, more preferably 50 to 300 parts by weight per 100 parts by weight of the cyclic ketone compound used.

For the condition of the reaction between the chlorosilane compound and the cyclic ketone compound, it is preferable that typically, the cyclic ketone compound is added dropwise to chlorosilane at a temperature of 0 to 120° C., preferably 0 to 100° C., and the mixture is reacted at 50 to 120° C., preferably 60 to 100° C. for 1 to 48 hours, more preferably for about 3 to 30 hours. If the temperature during the reaction is excessively low, there is a possibility that the reaction is not completed, and if the temperature during the reaction is excessively high, coloring of the product may increase. If the reaction time is excessively short, there is a possibility that the reaction is not completed, and if the reaction time is excessively long, productivity is adversely affected.

Purification after completion of the reaction can be performed by distilling an intended product in a decompression environment, and the decompression degree is preferably $1\times10^{-5}$ to 3,000 Pa, more preferably $1\times10^{-5}$ to 2,000 Pa, and the temperature during purification is preferably 100 to 250° C., more preferably 120 to 230° C. If the pressure during decompression (decompression degree) is excessively high, distillation may be difficult. If the temperature during purification is excessively low, purification by distillation may be difficult, and an excessively high temperature during purification may cause coloring and decomposition of the reactant.

Specific examples of the hydrolyzable organosilane compound as the component (B) include compounds of the following formula. Me represents a methyl group.

[Chem. 15]

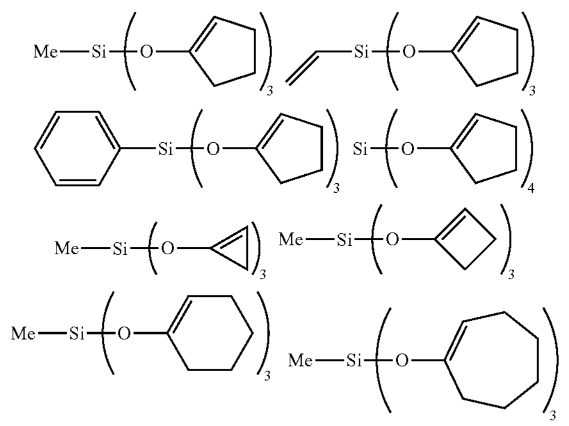

-continued

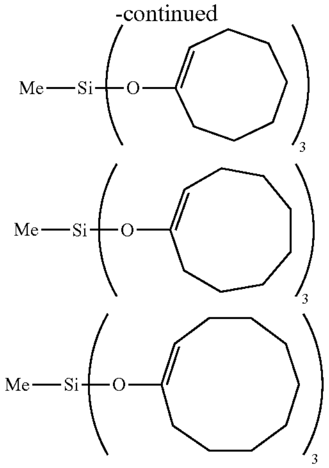

The hydrolyzable organosilane compound and/or partial hydrolytic condensates thereof as the component (B) may be used alone or used in combination of two or more thereof.

The component (B) is blended into the first pack, and the compounding amount thereof is 0.1 to 30 parts by weight, preferably 0.5 to 25 parts by weight per 100 parts by weight of the total of the component (A) and the component (A'). If the compounding amount of the component (B) is too small, sufficient crosslinking cannot be obtained when the composition is cured, and if the compounding amount is too large, the mechanical properties (rubber physical properties) of the obtained cured product (silicone rubber) may be deteriorated, which may cause a problem of being economically disadvantageous.

[Component (C): Curing Catalyst]

The curing catalyst as the component (C) is used to accelerate hydrolysis condensation reaction, and is generally called a curing catalyst. As the curing catalyst, a known one that is usually used for a room temperature curable silicone resin composition that cures in the presence of moisture can be used.

Among the curing catalysts as the components (C), a nonmetallic organic catalyst is not particularly limited, but a known curing accelerator of the condensation-curable organopolysiloxane composition can be used. Examples thereof include phosphazene-containing compounds such as N,N,N',N',N'",N'"-hexamethyl-N'"-(trimethylsilylmethyl)-phosphorimidic triamide; quaternary ammonium salts such as benzyltriethylammonium acetate; dialkylhydroxylamines such as dimethylhydroxylamine and diethylhydroxylamine; silanes and siloxanes containing a guanidyl group, such as γ-(N,N,N',N'-tetramethylguanidyl)propyltrimethoxysilane, γ-(N,N,N',N'-tetramethylguanidyl)propylmethyldimethoxysilane, and γ-(N,N,N',N'-tetramethylguanidyl)propyltris(trimethylsiloxy)silane. Also, the nonmetallic organic catalysts may be used singly or in a mixture of two or more kinds thereof.

Among the curing catalysts as the components (C), the metallic catalyst is not particularly limited, but a known one can be used as a curing catalyst of a condensation-curable organopolysiloxane. Examples thereof include alkyltin ester compounds such as dibutyltin diacetate, dibutyltin dilaurate, dibutyltin dioctoate, dimethyltin dineodecanoate, dioctyltin dineodecanoate, and di-n-butyl-dimethoxytin; titanate esters or titanium chelate compounds such as tetraisopropoxytitanium, tetra-n-butoxytitanium, tetrakis(2-ethylhexoxy)titanium, dipropoxybis(acetylacetonato)titanium, and titanium isopropoxyoctylene glycol; zinc naphthenate, zinc stearate, zinc-2-ethyl octoate; alkolate aluminum compounds such as aluminum isopropylate and aluminum secondary butyrate; aluminum chelate compounds such as aluminum alkyl acetate diisopropylate and aluminum bisethyl acetoacetate monoacetylacetonate; organometallic compounds such as bismuth(III) neodecanoate, bismuth(III) 2-ethylhexanoate, bismuth(III) citrate, bismuth octylate, iron-2-ethylhexoate, cobalt-2-ethylhexoate, manganese-2-ethylhexoate, and cobalt naphthenate; lower fatty acid salts of alkali metals such as potassium acetate, sodium acetate, and lithium oxalate. The metallic catalyst is not limited thereto. The metallic catalysts may be used singly or in a mixture of two or more kinds thereof.

The component (C) is blended into the first pack, and the compounding amount thereof is 0.001 to 10 parts by weight, preferably 0.005 to 8 parts, more preferably 0.01 to 5 parts by weight per 100 parts by weight of the total of the component (A) and the component (A'). When the compounding amount is less than 0.001 parts by weight, good curability cannot be obtained, so that a problem that the curing rate is delayed occurs. On the contrary, when the compounding amount exceeds 10 parts by weight, curability of the composition is too fast, and therefore an allowable range of working time after application of the composition is shortened, or mechanical properties (rubber physical properties) of a cured product (silicone rubber) to be obtained are deteriorated.

[Component (D): Curing Accelerator]

The component (D) is an amine compound having a primary amino group (that is, an amino group having a $-NH_2$ structure, excluding a guanidyl group), reacts with a cyclic ketone compound produced by hydrolysis of the component (B) to produce water, and remarkably improves the deep curability of the composition. The component (D) is not particularly limited as long as it has a primary amino group, and specific examples thereof include aliphatic amines such as methylamine, ethylamine, butylamine, pentylamine, hexylamine, heptylamine, octylamine, nonylamine, and dodecylamine; aliphatic polyamines such as ethylenediamine and triethylenetetramine; aromatic amines such as aniline; cyclic amines such as cyclopentylamine, cyclohexylamine, and 2-ethylcyclohexylamine; primary amino group-containing silane coupling agents such as aminosilanes such as γ-aminopropyltrimethoxysilane, γ-aminopropyltriethoxysilane, and 3-2-(aminoethylamino)propyltrimethoxysilane [aka: N-2-(aminoethyl)-3-aminopropyltrimethoxysilane]; and primary amino group-containing organosilicon compounds such as primary amino group-containing polysiloxane. These compounds may be used singly or in combination of two or more thereof.

When the component (D) is blended, the component may be blended into the first pack, the second pack, or both packs, and the compounding amount thereof is preferably 0 to 20 parts by weight, more preferably 0 to 10 parts by weight in each of the first pack and the second pack (with the proviso that at least either one of the first and second packs contains 0.1 parts by weight or more) per 100 parts by weight of the total of the component (A) and the component (A'). That is, when the component (D) is blended, the total compounding amount in the composition is preferably 0.1 to 20 parts by weight, particularly preferably 0.5 to 10 parts by weight per 100 parts by weight of the total of the component (A) and the component (A'). When the compounding amount of the component (D) is less than 0.1 parts by weight, the amount of water produced by reacting with the cyclic ketone compound generated by hydrolysis of the component (B) is small, and sufficient deep curability is not exhibited, and when the compounding amount exceeds 20 parts by weight, it is disadvantageous from the viewpoint of the characteristics and storage-ability of the obtained cured product.

[Component (E): Inorganic Filling Agent]

In the two-pack type room temperature fast-curable organopolysiloxane composition of the present invention, an inorganic filling agent as a component (E) can be blended as an optional component if necessary. The inorganic filling agent as the component (E) is a reinforcing or non-reinforcing filling agent for imparting rubber physical properties to the two-pack type room temperature fast-curable organopolysiloxane composition of the present invention. Examples of the inorganic filling agent as the component (E) include silica-based filling agents such dry silica such as pyrogenic silica and fumed silica, and wet silica such as precipitated silica and sol-gel process silica, carbon black, talc and bentonite which are surface-hydrophobized or untreated, surface-treated or untreated calcium carbonate, zinc carbonate, magnesium carbonate, and surface-treated or untreated calcium oxide, zinc oxide, magnesium oxide, aluminum oxide and aluminum hydroxide, and among them, calcium carbonate, fumed silica, precipitated silica, carbon black and aluminum oxide are preferable, and calcium carbonate, fumed silica, precipitated silica, carbon black and aluminum oxide whose surface of the inorganic filling agent is subjected to hydrophobic treatment are more preferable. In this case, the amount of moisture in these inorganic filling agents is preferably small.

The type, amount and surface-treating method and the like of the surface treatment agent (hydrophobizing agent) are not particularly limited, and typically, organosilicon compounds such as chlorosilane, alkoxysilane and organosilazane, and treatment agents such as fatty acid, paraffin, silane coupling agents and titanium coupling agents can be applied.

The inorganic filling agents as the components (E) may be used alone or used in combination of two or more thereof.

When the component (E) is blended, the component may be blended into the first pack, the second pack, or both packs, and the compounding amount thereof is preferably 0 to 1,000 parts by weight, more preferably 0 to 500 parts by weight in each of the first pack and the second pack (with the proviso that at least either one of the first and second packs contains 0.1 parts by weight or more) per 100 parts by weight of the total of the component (A) and the component (A'). That is, when the component (E) is blended, the total compounding amount in the composition is preferably 0.1 to 1,000 parts by weight, particularly preferably 1 to 500 parts by weight per 100 parts by weight of the total of the component (A) and the component (A'). When the compounding amount is more than 1,000 parts by weight, not only the viscosity of the composition increases to deteriorate workability, but also the rubber strength after curing decreases to make it difficult to obtain rubber elasticity.

[Component (F): Adhesion Promoter]

The component (F) is an adhesion promoter, is an optional component that can be blended as necessary, and is used to impart sufficient adhesive property to a cured product formed from the two-pack type room temperature fast-curable organopolysiloxane composition of the present invention. As the adhesion promoter, a known one is suitably used, and examples thereof include silane coupling agents such as functional group-containing hydrolyzable silanes (excluding the component (B), and the aminosilanes having a primary amino group described in the curing accelerator (D)), specifically, vinylsilane coupling agents, (meth)acrylsilane coupling agents, epoxysilane coupling agents, mercaptosilane coupling agents, and isocyanatosilane coupling agents, and specific examples include vinyltris(β-methoxyethoxy)silane, γ-acryloxypropyltrimethoxysilane, γ-methacryloxypropyltrimethoxysilane, β-(3,4-epoxycyclohexyp-ethyltrimethoxysilane, γ-glycidoxypropyltrimethoxysilane, γ-glycidoxypropylmethyldiethoxysilane, γ-mercaptopropyltrimethoxysilane, and 3-isocyanatopropyltriethoxysilane.

Among them, (meth)acrylic silanes such as γ-methacryloxypropyltrimethoxysilane and γ-acryloxypropyltrimethoxysilane, epoxy silanes such as γ-glycidoxypropyltrimethoxysilane and β-(3,4-epoxycyclohexypethyltrimethoxysilane, and isocyanate silanes such as 3-isocyanatopropyltriethoxysilane are particularly preferable.

When the component (F) is blended, the component may be blended into the first pack, the second pack, or both packs, and the compounding amount thereof is preferably 0 to 10 parts by weight in each of the first pack and the second pack (with the proviso that at least either one of the first and second packs contains 0.001 parts by weight or more), particularly preferably 0.1 to 10 parts by weight in each of the first pack and the second pack per 100 parts by weight of the total of the component (A) and the component (A'). That is, when the component (F) is blended, the total compounding amount in the composition is preferably 0.001 to 10 parts by weight, particularly preferably 0.1 to 10 parts by weight per 100 parts by weight of the total of the component (A) and the component (A'). When the composition free of the adhesion promoter is adhesive, depending on a particular inorganic filling agent and adherend, the adhesion promoter may not be used.

[Other Components]

In addition, the two-pack type room temperature fast-curable organopolysiloxane composition of the present invention preferably contains the components (A), (A'), (B), and (C) as essential components, and further contains the components (D), (E), and (F). In addition, known additives such as a pigment, a dye, an antiaging agent, an antioxidant, an antistatic agent, a flame retardant such as antimony oxide and paraffin chloride can be blended as additives. Furthermore, a polyether as a thixotropy improver, an antifungal agent, and an antibacterial agent can be blended.

Moreover, in the two-pack type room temperature fast-curable organopolysiloxane composition of the present invention, an organic solvent may be used as necessary. Examples of the organic solvent include aliphatic hydrocarbon-based compounds such as n-hexane, n-heptane, isooctane, and isododecane; aromatic hydrocarbon-based compounds such as toluene and xylene; chain siloxanes such as hexamethyldisiloxane, octamethyltrisiloxane, decamethyltetrasiloxane, dodecamethylpentasiloxane, and 2-(trimethylsiloxy)-1,1,1,2,3,3,3-heptamethyltrisiloxane; and cyclic siloxanes such as octamethylcyclopentasiloxane and decamethylcyclopentasiloxane. The amount of the organic solvent may be appropriately adjusted within a range not hindering the effect of the present invention.

[Preparation of Two-Pack Type Room Temperature Fast-Curable Organopolysiloxane Composition]

The two-pack type room temperature fast-curable organopolysiloxane composition of the present invention includes a first pack containing the components (A), (B), and (C), and a second pack containing the component (A') but containing no components (B) and (C). By providing a composition of two-pack type consisting of the first pack and the second pack, the composition is excellent in fast curability and deep curability. This is presumed to be because when the first pack and the second pack are mixed, the hydrolyzable silyl group in the organopolysiloxane having a specific structure in which the molecular chain terminal is blocked with a hydrolyzable silyl group of the component (A) as a base polymer or the organopolysiloxane in which the molecular chain terminal is blocked with the hydrolyzable silyl group which is produced by allowing (A) an organopolysiloxane in which a molecular chain terminal is blocked with a silanol group and (B) a specific hydrolyzable silane compound to coexist with (C) a curing catalyst in the first pack, and the silanol group in the organopolysiloxane in which the molecular chain terminal is blocked with a silanol group of the component (A') as a base polymer in the second pack are directly hydrolyzed/condensed (crosslinking reaction).

The first pack can be prepared by mixing all of the components (A), (B), and (C) and, if necessary, some or all of the components (D), (E), and (F) and other components according to a conventional method. Also, the second pack can be prepared by mixing all of the component (A') and, if necessary, the rest or all of the components (D), (E), and (F) and other components according to a conventional method.

In the component (A) and the component (A') as base polymers, the component (A) is blended into the first pack, and the component (A') is blended into the second pack. The component (A) is blended into the first pack in an amount of 10 to 90 parts by weight, particularly 30 to 70 parts by weight, and the component (A') is blended into the second pack in an amount of 10 to 90 parts by weight, particularly 30 to 70 parts by weight (with the proviso that the total amount of the component (A) and the component (A') is 100 parts by weight).

In addition, the optional components (D), (E), and (F) and other components may be blended into either the first pack or the second pack, or may be blended into either one or both of them. In particular, it is preferable that the components (D), (E), and (F) are blended into the first pack and the components (D) and (E) are blended into the second pack.

Here, when the component (D) is blended into the first pack and the second pack, it is preferable to blend the component (D) into the first pack and the second pack at a weight ratio of 1:99 to 99:1, particularly 30:70 to 70:30 from the viewpoint of storage stability of the composition.

In addition, when the component (E) is blended into the first pack and the second pack, it is preferable to blend the component (E) into the first pack and the second pack at a weight ratio of 80:20 to 20:80, particularly 60:40 to 40:60 from the viewpoint of uniformity (ease of mixing) of the composition at the time of mixing.

As the ratio of the first pack and the second pack, it is preferable to blend the first pack and the second pack at a weight ratio of 100:10 to 100:100, particularly 100:25 to 100:100 from the viewpoint of workability and the uniformity (ease of mixing) of the composition when mixing the first pack and the second pack.

The two-pack type room temperature fast-curable organopolysiloxane composition of the present invention can be obtained by uniformly mixing the above-described components, and further, predetermined amounts of the above-described various additives in a dry atmosphere.

In addition, since the two-pack type room temperature fast-curable organopolysiloxane composition of the present invention has storage stability, the first pack and the second pack produced as described above can be stored in an atmosphere avoiding moisture.

[Method for Curing Two-Pack Type Room Temperature Fast-Curable Organopolysiloxane Composition]

The two-pack type room temperature fast-curable organopolysiloxane composition of the present invention is usually cured in 10 minutes to 5 days at room temperature by mixing them at a suitable ratio, specifically, a ratio of the first pack and the second pack at a weight ratio of 1:1 to 10:1, particularly 1:1 to 4:1.

By virtue of fast curability, the two-pack type room temperature fast-curable organopolysiloxane composition of the present invention cures in a short time of 10 minutes to 3 days in contrast to the standard curing time of 3 days to 5 days in the case of molding into a sheet having a thickness of 2 mm at 23° C. and 50% RH.

By virtue of deep curability, the two-pack type room temperature fast-curable organopolysiloxane composition of the present invention cures to a deep portion (measurable thickness) in a short time of 30 minutes in contrast to the standard time of 2 hours in the case of conditions of curing with a glass petri dish with an inner diameter of 10 mm and a depth of 20 mm at 23° C. and 50% RH.

The two-pack type room temperature fast-curable organopolysiloxane composition of the present invention is cured by leaving the composition to stand at room temperature, and as the molding method, curing conditions and the like for the composition, a known method and known conditions can be adopted according to various applications and intended uses, such as electronic parts, vehicles, and building applications.

The two-pack type room temperature fast-curable organopolysiloxane composition of the present invention is friendly to the human body and the environment as the compound generated from a crosslinking agent through a hydrolysis reaction during curing is a cyclic ketone compound having high safety, such as cyclobutanone or cyclopentanone. Further, cyclopentanone has high safety as it has a burning point of 35° C., which is higher than that of a dealcoholization-type compound that releases an alcohol compound such as methanol during curing of the composition. The two-pack type room temperature fast-curable organopolysiloxane composition of the present invention exhibits good curability with the use of various existing catalysts, and a cured product thereof (silicone rubber) is excellent in adhesive property.

Therefore, the two-pack type room temperature fast-curable organopolysiloxane composition of the present invention is useful as an adhesive agent, a sealing agent, a potting agent, a coating agent or the like. The method for using the two-pack type room temperature fast-curable organopolysiloxane composition of the present invention as an adhesive agent, a sealing agent, a potting agent or a coating agent may follow a heretofore to known method.

Examples of the relevant article include automobile parts, automobile oil seals, electrical or electronic parts, building structures, and civil engineering structures.

EXAMPLES

Hereinafter, Synthesis Example, Examples and Comparative Examples specifically describing the present invention are described, but the present invention is not limited to the following Examples. In the following Examples, the viscosity is a value measured at 23° C. with a rotational viscometer in accordance with the method specified in JIS Z 8803.

Synthesis Example 1

Synthesis of vinyltris(1-cyclopenten-1-yloxy)silane

A 5,000 mL four-neck separable flask equipped with a mechanical stirrer, a thermometer, a reflux tube and a dropping funnel was charged with 834 g (9.9 mol) of cyclopentanone, 825 g (8.2 mol) of triethylamine, 5 g (0.05 mol) of copper (I) chloride and 1,500 ml of hexane, and 400 g (2.47 mol) of vinyltrichlorosilane was added dropwise at 40 to 60° C. over about 2 hours. Thereafter, the mixture was stirred at 80° C. for 12 hours, triethylamine hydrochloride generated was then removed by filtration, hexane was distilled off from the filtrate under the conditions of 100° C. and normal pressure, and the mixture was then distilled under the conditions of 180° C. and 300 Pa to obtain vinyltris(1-cyclopenten-1-yloxy)silane (yield 532 g, yield coefficient 69%). This reaction formula is represented by, for example, the following formula [2].

[Chem. 16]

[2]

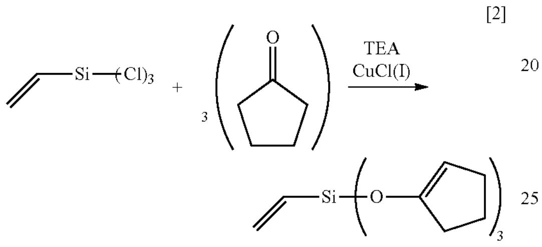

Example 1

Preparation of First Pack (a)

A first pack (a) was prepared by mixing the following under reduced pressure until uniform; (Component (A)) 50 parts by weight of dimethylpolysiloxane having a viscosity at 23° C. of 20,000 mPa·s and having both molecular chain terminals blocked with silanol groups (hydroxyl groups bonded to a silicon atom), (component (E)) 5 parts by weight of to surface dimethyldichlorosilane-treated fumed silica having a BET specific surface area of 130 $m^2/g$, (component (B)) 3.5 parts by weight of vinyltris(1-cyclopenten-1-yloxy) silane, 0.4 parts by weight of (component (C)) γ-(N,N,N',N'-tetramethylguanidyl)propyltrimethoxysilane, and (component (D)) 0.5 parts by weight of γ-aminopropyltrimethoxysilane.

Preparation of Second Pack (a)

A second pack (a) was prepared by mixing the following under reduced pressure until uniform; (Component (A')) 50 parts by weight of dimethylpolysiloxane having a viscosity at 23° C. of 20,000 mPa·s and having both molecular chain terminals blocked with silanol groups (hydroxyl groups bonded to a silicon atom) and (component (E)) 5 parts by weight of surface dimethyldichlorosilane-treated fumed silica having a BET specific surface area of 130 $m^2/g$.

The first pack (a) and the second pack (a) were uniformly mixed at a mixing ratio (weight ratio) of 1:1 to produce a composition 1. Further, the composition 1 was allowed to stand and cured for 1 day and 3 days under conditions of 23° C. and 50% RH, respectively, to obtain cured products 1-1 and 1-2.

Example 2

Preparation of Second Pack (b)

A second pack (b) was prepared by mixing the following under reduced pressure until uniform; (Component (A')) 50 parts by weight of dimethylpolysiloxane having a viscosity at 23° C. of 20,000 mPa·s and having both molecular chain terminals blocked with silanol groups (hydroxyl groups bonded to a silicon atom), (component (E)) 5 parts by weight of surface dimethyldichlorosilane-treated fumed silica having a BET specific surface area of 130 $m^2/g$, and (component (D)) 2 parts by weight of octylamine.

The first pack (a) prepared in Example 1 and the second pack (b) were uniformly mixed at a mixing ratio (weight ratio) of 1:1 to produce a composition 2. Further, the composition 2 was allowed to stand and cured for 1 day and 3 days under conditions of 23° C. and 50% RH, respectively, to obtain cured products 2-1 and 2-2.

Example 3

Preparation of First Pack (b)

A first pack (b) was prepared by mixing the following under reduced pressure until uniform; (Component (A)) 50 parts by weight of dimethylpolysiloxane having a viscosity at 23° C. of 20,000 mPa·s and having both molecular chain terminals blocked with silanol groups (hydroxyl groups bonded to a silicon atom), (component (E)) 5 parts by weight of surface dimethyldichlorosilane-treated fumed silica having a BET specific surface area of 130 $m^2/g$, (component (B)) 3.5 parts by weight of vinyltris(1-cyclopenten-1-yloxy) silane, (component (C)) 0.4 parts by weight of γ-tetramethylguanidylpropyltrimethoxysilane, and (component (D)) 0.5 parts by weight of γ-aminopropyltrimethoxysilane, and (component (F)) 0.5 parts by weight of γ-glycidoxypropyltrimethoxysilane.

The first pack (b) and the second pack (b) prepared in Example 2 were uniformly mixed at a mixing ratio (weight ratio) of 1:1 to produce a composition 3. Further, the composition 3 was allowed to stand and cured for 1 day and 3 days under conditions of 23° C. and 50% RH, respectively, to obtain cured products 3-1 and 3-2.

Comparative Example 1

Preparation of First Pack (c)

A first pack (c) was prepared by mixing the following under reduced pressure until uniform; (Component (A)) 50 parts by weight of dimethylpolysiloxane having a viscosity at 23° C. of 20,000 mPa·s and having both molecular chain terminals blocked with silanol groups (hydroxyl groups bonded to a silicon atom), (component (E)) 5 parts by weight of surface dimethyldichlorosilane-treated fumed silica having a BET specific surface area of 130 $m^2/g$, 2.5 parts by mass of vinyltrimethoxysilane, (component (C)) 0.05 parts by weight of dioctyltin dilaurate, (component (D)) 0.5 parts by weight of γ-aminopropyltrimethoxysilane, and (component (F)) 0.5 parts by weight of γ-glycidoxypropyltrimethoxysilane.

The first pack (c) and the second pack (b) prepared in Example 2 were uniformly mixed at a mixing ratio (weight ratio) of 1:1 to produce a composition 4. Further, the composition 4 was allowed to stand and cured for 1 day and 3 days under conditions of 23° C. and 50% RH, respectively, to obtain cured products 4-1 and 4-2.

Comparative Example 2

Preparation of First Pack (d)

A first pack (d) was prepared by mixing the following under reduced pressure until uniform; (Component (A)) 50 parts by weight of dimethylpolysiloxane having a viscosity at 23° C. of 20,000 mPa·s and having both molecular chain terminals blocked with silanol groups (hydroxyl groups bonded to a silicon atom), (component (E)) 5 parts by weight of surface dimethyldichlorosilane-treated fumed silica having a BET specific surface area of 130 $m^2/g$, 3.5 parts by weight of vinyltris(methylethylketoxime)silane, (component (C)) 0.05 parts by weight of dioctyltin dilaurate, (component (D)) 0.5 parts by weight of γ-aminopropyltrimethoxysilane, and (component (F)) 0.5 parts by weight of γ-glycidoxypropyltrimethoxysilane.

The first pack (d) and the second pack (b) prepared in Example 2 were uniformly mixed at a mixing ratio (weight ratio) of 1:1 to produce a composition 5. Further, the composition 5 was allowed to stand and cured for 1 day and 3 days under conditions of 23° C. and 50% RH, respectively, to obtain cured products 5-1 and 5-2.

Test Method

Using each of the compositions prepared in Examples 1 to 3 and Comparative Examples 1 and 2, curability, rubber physical properties, and adhesive property were evaluated by the following methods.

Curability

Tack-Free Time:

Using each of the compositions prepared in Examples 1 to 3 and Comparative Examples 1 and 2, the tack-free time (skin-over time) was measured in accordance with the method specified in JIS A-5758.

Deep Curability:

Each of the compositions prepared in Examples 1 to 3 and Comparative Examples 1 and 2 was filled in a glass petri dish with an inner diameter of 10 mm and a depth of 20 mm, and after 20 minutes at 23° C. and 50% RH, the thickness from a surface portion exposed to air to a cured portion was measured to evaluate deep curability.

Initial Sealability:

In order to compare the curability, initial sealability was measured. As a test method for initial sealability, a pressure resistance test was performed using a pressure vessel similar to a flange pressure vessel for pressure resistance test specified in JIS K-6820 as a test apparatus. The pressure vessel includes an upper vessel having an upper flange having an inner vessel of 58 mm, an outer diameter of 80 mm, and a thickness of 10 mm, and a lower vessel having a lower flange having the same dimensions as the upper flange. An annular notch with a width of 3 mm and a depth of 3 mm is provided along the circumference at an inner side edge portion of a sealing surface of the lower flange. The sealing surface of the lower flange was washed with toluene. Thereafter, the composition was applied in a bead shape to the central portion of the lower sealing surface in an application amount sufficient to fill the sealing surface. Immediately after the application, the upper vessel was placed on the lower vessel such that the sealing surfaces of the upper flange and the lower flange were in contact with each other, and an iron spacer with a height of 21 mm (in the thickness direction of the flange) for defining the distance between the sealing surfaces of the upper and lower flanges was installed, and four fastening bolts were assembled. An interval of 1 mm is generated between the sealing surfaces by the spacer, and this is because a pressure resistance test for the sealing material is made more severe, that is, a so-called accelerated test is performed. Thereafter, after curing at 23° C. and 50% RH for 30 minutes, a gas was inserted through the upper pressurizing port, the pressure of the gas that the sealing material, which is a cured product of the above composition, could withstand was measured, and a composition having a pressure of 400 kPa or more was determined to be acceptable.

Rubber Physical Properties

Each of the compositions immediately after preparation prepared in Examples 1 to 3 and Comparative Examples 1 and 2 was extruded into a sheet with a thickness of 2 mm, exposed to air at 23° C. and 50% RH, and then the sheet was left in the same atmosphere for 1 day or 3 days to obtain a cured product, and the rubber physical properties (hardness, elongation at break, tensile strength) of the cured product were measured in accordance with JIS K-6249. The hardness was measured using a durometer A hardness meter of JIS K-6249.

Adhesive Property

From the compositions prepared in Examples 1 to 3 and Comparative Examples 1 and 2, using aluminum or glass with a width of 25 mm and a length of 100 mm as adherends, shear adhesion test specimens were prepared by bonding adherends of the same material to each other with an adhesion area of 2.5 $mm^2$ and an adhesion thickness of 1 mm of each test piece using the above composition, and after curing at 23° C. and 50% RH for 1 day or 3 days, the shear adhesion force to aluminum or glass was measured according to the method specified in JIS K-6249 using these test specimens.

The test results of Examples 1 to 3 are shown in Table 1, and the test results of Comparative Examples 1 and 2 are shown in Table 2. In addition, the compounds desorbed from the curing agent during curing, and the presence or absence of health harmfulness and environmental harmfulness of the compounds are also shown in Tables 1 and 2.

TABLE 1

| Measurement results | | Example 1 | | Example 2 | | Example 3 | |
|---|---|---|---|---|---|---|---|
| | Composition | 1 | | 2 | | 3 | |
| Curability | Tack-free time (min) | 3 | | 3 | | 3 | |
| | Deep curability (mm) | 1.1 | | 2.4 | | 2.6 | |
| | Initial sealability (kPa) | 450 | | 600 | | 600 | |
| | Determination | Pass | | Pass | | Pass | |
| | Days of curing | 1 | 3 | 1 | 3 | 1 | 3 |
| | Cured product | 1-1 | 1-2 | 2-1 | 2-2 | 3-1 | 3-2 |
| Rubber physical properties | Hardness Type A | 26 | 28 | 27 | 28 | 28 | 29 |
| | Elongation at break (%) | 290 | 300 | 280 | 330 | 270 | 290 |
| | Tensile strength (MPa) | 1.4 | 1.6 | 1.5 | 1.5 | 1.4 | 1.5 |
| Adhesive property | Shear adhesive force (Aluminum) (MPa) | 0.86 | 0.91 | 0.91 | 0.91 | 0.96 | 1.0 |
| | Shear adhesive force (Glass) (MPa) | 0.84 | 0.88 | 0.84 | 0.85 | 0.91 | 0.95 |
| Compound desorbed during curing | | Cyclopentanone | | Cyclopentanone | | Cyclopentanone | |
| Presence or absence of health harmfulness and environmental harmfulness of compound desorbed | | None | | None | | None | |

TABLE 2

| Measurement results | | Comparative Example 1 | | Comparative Example 2 | |
|---|---|---|---|---|---|
| Composition | | 4 | | 5 | |
| Curability | Tack-free time (min) | 16 | | 8 | |
| | Deep curability (mm) | Unmeasurable due to insufficient curing | | Unmeasurable due to insufficient curing | |
| | Initial sealability (kPa) | 30 | | 200 | |
| | Determination | Fail | | Fail | |
| Days of curing | | 1 | 3 | 1 | 3 |
| Cured product | | 4-1 | 4-2 | 5-1 | 5-2 |
| Rubber physical properties | Hardness Type A | 10 | 23 | 15 | 26 |
| | Elongation at break (%) | 460 | 280 | 350 | 320 |
| | Tensile strength (MPa) | 0.5 | 1.3 | 0.7 | 1.5 |
| Adhesive property | Shear adhesive force (Aluminum) (MPa) | 0.31 | 0.66 | 0.51 | 0.81 |
| | Shear adhesive force (Glass) (MPa) | 0.25 | 0.54 | 0.44 | 0.76 |
| Compound desorbed during curing | | Methanol | | 2-butanone oxime | |
| Presence or absence of health harmfulness and environmental harmfulness of compound desorbed | | Deleterious substances, disorders to organs | | Suspected carcinogenic, harmful to aquatic organisms | |

From the above results, it can be seen that the two-pack type room temperature fast-curable organopolysiloxane compositions of the present invention (compositions of Examples 1 to 3) have high values of deep curability and initial sealability, and have a small difference in rubber physical properties and adhesive strength between 1-day curing and 3-day curing, and thus have high curability as compared with the conventional dealcoholization (composition of Comparative Example 1) and deoximation (composition of Comparative Example 2) cured forms.

The compound released by the compositions of Examples during curing is cyclopentanone, which is a compound having high safety without having been reported to have health harmfulness to the human body such as carcinogenicity and reproduction toxicity, or environmental harmfulness such as toxicity to aquatic organisms. On the other hand, the compounds released by the compositions of Comparative Examples during curing are all indicated as having health harmfulness in SDS (safety data sheet) or the like. The compounds include methanol which is designated as a deleterious substance and has strong toxicity to the human body, and 2-butanone oxime which may be carcinogenic and has toxicity to aquatic organisms. In addition, it can be seen that the two-pack type room temperature fast-curable organopolysiloxane composition of the present invention is further excellent from the viewpoint of the health and safety of the human body and environmental protection because methanol has a lower burning point and boiling point as compared to cyclopentanone.

The invention claimed is:

1. A two-pack type room temperature fast-curable organopolysiloxane composition consisting of:

(i) a first pack comprising (A) 10 to 90 parts by weight of an organopolysiloxane having the following general formula (1), (2), or (3):

(1)

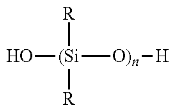

wherein R is the same or different and is an unsubstituted or halogen atom-substituted monovalent hydrocarbon group having 1 to 10 carbon atoms, and n is an integer of 5 or more, (2)

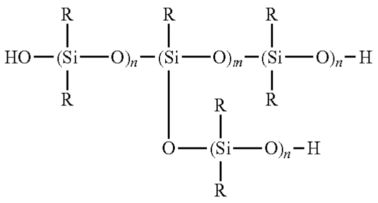

wherein R and n are as described above, n may be the same or different, and m is an integer of 1 to 10, (3)

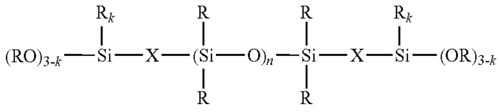

wherein R and n are as described above, X is an oxygen atom or an alkylene group having 2 to 5 carbon atoms, and k is 0 or 1 independently for each silicon atom to be bonded, with the proviso that the total amount of the components (A) and (A') is 100 parts by weight, (B) a hydrolyzable organosilane compound having the following general formula (4) and/or a partial hydrolytic condensate thereof, in an amount of 0.1 to 30 parts by weight per 100 parts by weight of the total of the components (A) and (A'), (4)

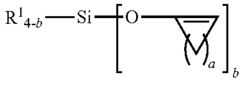

wherein $R^1$ is a monovalent hydrocarbon group having 1 to 10 carbon atoms, a is an integer of 1 to 8, and b is 3 or 4, and (C) a curing catalyst in an amount of 0.001 to 10 parts by weight per 100 parts by weight of the total of the components (A) and (A'), and (ii) a second pack, comprising no components (B) and (C), comprising (A') 10 to 90 parts by weight of an organopolysiloxane having the following general formula (1) or (2):

(1)

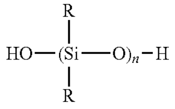

wherein R is the same or different and is an unsubstituted or halogen atom-substituted monovalent hydrocarbon group having 1 to 10 carbon atoms, and n is an integer of 10 or more, (2)

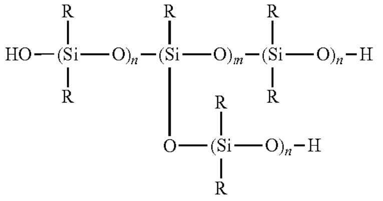

wherein R and n are as described above, n may be the same or different, and m is an integer of 1 to 10, with the proviso that the total amount of the components (A) and (A') is 100 parts by weight, and at least one of said first and second packs further comprising (D) an amine compound having a primary amino group as a curing accelerator in an amount of 0 to 20 parts by weight per 100 parts by weight of the total of the components (A) and (A') in each of the first and second packs, with the proviso that at least one of the first and second packs contains 0.1 parts by weight or more of the amine compound wherein the component (D) is at least one member selected from the group consisting of aliphatic amines, aliphatic polyamines, aromatic amines, cyclic amines, γ-aminopropyltrimethoxysilane, γ-aminopropyltriethoxysilane, 3-2-(aminoethylamino) propyltrimethoxysilane, and primary amino group-containing organosilicon compounds.

2. The two-pack type room temperature fast-curable organopolysiloxane composition according to claim 1, wherein the hydrolyzable organosilane compound and/or a partial hydrolytic condensate thereof as the component (B) desorbs a cyclic ketone compound by hydrolysis.

3. The two-pack type room temperature fast-curable organopolysiloxane composition according to claim 2, wherein the cyclic ketone compound desorbed is cyclobutanone or cyclopentanone.

4. The two-pack type room temperature fast-curable organopolysiloxane composition according to claim 1, further comprising (E) an inorganic filling agent in an amount of 0 to 1,000 parts by weight per 100 parts by weight of the total of the components (A) and (A') in each of the first and second packs, with the proviso that at least either one of the first and second packs contains 0.1 parts by weight or more of the inorganic filling agent.

5. The two-pack type room temperature fast-curable organopolysiloxane composition according to claim 4, wherein the component (E) is one or more inorganic filling agents selected from the group consisting of calcium carbonate, fumed silica, precipitated silica, carbon black, and aluminum oxide.

6. The two-pack type room temperature fast-curable organopolysiloxane composition according to claim 1, further comprising (F) an adhesion promoter in an amount of 0 to 10 parts by weight per 100 parts by weight of the total of the components (A) and (A') in each of the first and second packs, with the proviso that at least either one of the first and second packs contains 0.001 parts by weight or more of the adhesion promoter.

7. The two-pack type room temperature fast-curable organopolysiloxane composition according to claim 1, wherein a blending ratio of the first and second packs is 1:1 to 10:1 by weight ratio.

8. An automobile part comprising a cured product of the two-pack type room temperature fast-curable organopolysiloxane composition according to claim 1.

9. An automobile oil seal comprising a cured product of the two-pack type room temperature fast-curable organopolysiloxane composition according to claim 1.

10. An electrical or electronic part comprising a cured product of the two-pack type room temperature fast-curable organopolysiloxane composition according to claim 1.

11. A building structure comprising a cured product of the two-pack type room temperature fast-curable organopolysiloxane composition according to claim 1.

12. A civil engineering structure comprising a cured product of the two-pack type room temperature fast-curable organopolysiloxane composition according to claim 1.

13. An adhesive agent comprising the two-pack type room temperature fast-curable organopolysiloxane composition according to claim 1.

14. A sealing agent comprising the two-pack type room temperature fast-curable organopolysiloxane composition according to claim 1.

15. A potting agent comprising the two-pack type room temperature fast-curable organopolysiloxane composition according to claim 1.

16. A coating agent comprising the two-pack type room temperature fast-curable organopolysiloxane composition according to claim 1.

17. The two-pack type room temperature fast-curable organopolysiloxane composition according to claim 1, further comprising (E) an inorganic filling agent in an amount of 0 to 1,000 parts by weight per 100 parts by weight of the total of the components (A) and (A') in each of the first and second packs, with the proviso that at least either one of the first and second packs contains 0.1 parts by weight or more of the inorganic filling agent, and (F) an adhesion promoter in an amount of 0 to 10 parts by weight per 100 parts by weight of the total of the components (A) and (A') in each of the first and second packs, with the proviso that at least one of the first and second packs contains 0.001 parts by weight or more of the adhesion promoter, wherein the first pack consists of components (A), (B), (C), and (D) as essential components, and components (E) and (F) as optional components, and the second pack consists of components (A') and (D) as essential components, and components (E) and (F) as optional components.

18. A two-pack type room temperature fast-curable organopolysiloxane composition consisting of:

(i) a first pack consisting essentially of:

(A) 10 to 90 parts by weight of an organopolysiloxane having the following general formula (1), (2), or (3):

(1)

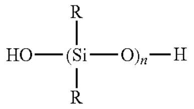

wherein R is the same or different and is an unsubstituted or halogen atom-substituted monovalent hydrocarbon group having 1 to 10 carbon atoms, and n is an integer of 5 or more, (2)

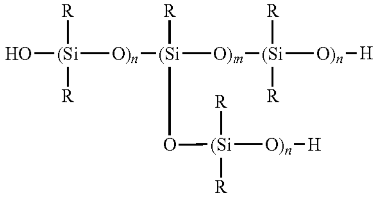

wherein R and n are as described above, n may be the same or different, and m is an integer of 1 to 10, (3)

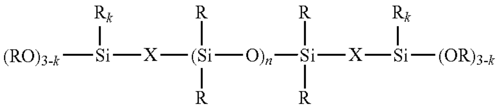

wherein R and n are as described above, X is an oxygen atom or an alkylene group having 2 to 5 carbon atoms, and k is 0 or 1 independently for each silicon atom to be bonded, with the proviso that the total amount of the components (A) and (A') is 100 parts by weight, (B) a hydrolyzable organosilane compound having the following general formula (4) and/or a partial hydrolytic condensate thereof, in an amount of 0.1 to 30 parts by weight per 100 parts by weight of the total of the components (A) and (A'), (4)

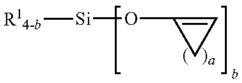

wherein $R^1$ is a monovalent hydrocarbon group having 1 to 10 carbon atoms, a is an integer of 1 to 8, and b is 3 or 4, and (C) a curing catalyst in an amount of 0.001 to 10 parts by weight per 100 parts by weight of the total of the components (A) and (A'), and (ii) a second pack, comprising no components (B) and (C), comprising (A') 10 to 90 parts by weight of an organopolysiloxane having the following general formula (1) or (2):

(1)

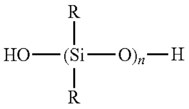

wherein R is the same or different and is an unsubstituted or halogen atom-substituted monovalent hydrocarbon group having 1 to 10 carbon atoms, and n is an integer of 10 or more, (2)

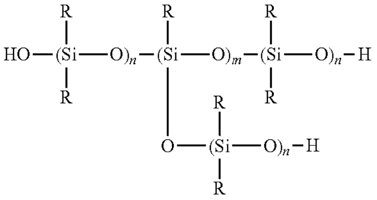

wherein R and n are as described above, n may be the same or different, and m is an integer of 1 to 10, with the proviso that the total amount of the components (A) and (A') is 100 parts by weight, and at least one of said first and second packs further comprising (D) an amine compound having a primary amino group as a curing accelerator in an amount of 0.1 to 20 parts by weight per 100 parts by weight of the total of the components (A) and (A') in each of the first and second packs, wherein the component (D) is at least one member selected from the group consisting of aliphatic amines, aliphatic polyamines, aromatic amines, cyclic amines, γ-aminopropyltrimethoxysilane, γ-aminopropyltriethoxysilane, 3-2-(aminoethylamino) propyltrimethoxysilane, and primary amino group-containing organosilicon compounds.

* * * * *